(12) United States Patent
Kato (10) Patent No.: US 7,785,021 B2
(45) Date of Patent: Aug. 31, 2010

(54) RETRACTABLE LENS CAMERA

(75) Inventor: Minoru Kato, Utsunomiya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/222,450

(22) Filed: Aug. 8, 2008

(65) Prior Publication Data

US 2008/0310035 A1 Dec. 18, 2008

Related U.S. Application Data

(63) Continuation of application No. 11/216,472, filed on Sep. 1, 2005, now abandoned.

(30) Foreign Application Priority Data

Sep. 2, 2004 (JP) ............................. 2004-255696

(51) Int. Cl.
*G03B 17/04* (2006.01)

(52) U.S. Cl. ................... 396/348; 396/349; 396/350; 359/817

(58) Field of Classification Search ............... 396/349, 396/73, 348, 350; 359/817
See application file for complete search history.

(56) References Cited

U.S. PATENT DOCUMENTS

| 4,451,129 A | 5/1984 | Ikari et al. ................... 396/63 |
| 4,597,657 A | 7/1986 | Wakabayashi et al. | |
| 4,669,848 A | 6/1987 | Wakabayashi et al. | |
| 4,841,323 A * | 6/1989 | Yamada et al. ................ 396/90 |
| 4,857,947 A * | 8/1989 | Wakabayashi et al. ....... 396/134 |
| 4,887,107 A * | 12/1989 | Nakamura et al. ............ 396/75 |
| 5,099,263 A * | 3/1992 | Matsumoto et al. .......... 396/75 |
| 6,978,088 B2 * | 12/2005 | Nomura ........................ 396/73 |
| 6,978,089 B2 * | 12/2005 | Nomura et al. ............... 396/75 |
| 7,035,019 B2 | 4/2006 | Sakamoto .................... 359/700 |
| 7,301,577 B2 * | 11/2007 | Sakamoto .................... 348/340 |
| 7,317,487 B2 * | 1/2008 | Omiya et al. ................ 348/335 |
| 7,632,024 B2 * | 12/2009 | Huang ......................... 396/349 |
| 2003/0156832 A1 | 8/2003 | Nomura et al. |
| 2004/0228626 A1 | 11/2004 | Endo et al. ................... 396/349 |
| 2005/0036777 A1 | 2/2005 | Nomura et al. ............... 396/73 |
| 2005/0185297 A1 * | 8/2005 | Omiya et al. ................ 359/704 |

FOREIGN PATENT DOCUMENTS

| JP | 63-034524 | 2/1988 |
| JP | 08-211483 | 8/1996 |
| JP | 08-234089 | 9/1996 |
| JP | 09-203842 | 8/1997 |
| JP | 2001-344381 | 12/2001 |

(Continued)

OTHER PUBLICATIONS

Pentax Optio S, (Mar. 28, 2003) Sliding Lens System, http://www.digital.pentax.co.jp/ja/optio¯s/index_h.html.

(Continued)

*Primary Examiner*—Rodney E Fuller
*Assistant Examiner*—Linda B Smith (57) ABSTRACT

A retractable lens camera includes: a lens barrel; three or more lens groups provided in the lens barrel; a retracting unit that retracts the lens barrel and the lens groups into a camera body; and a displacing unit that displaces at least two lens groups to an escaping space out of an optical axis.

9 Claims, 9 Drawing Sheets

FOREIGN PATENT DOCUMENTS

| | | |
|---|---|---|
| JP | 2003-149723 | 5/2003 |
| JP | 2003-315861 | 11/2003 |
| JP | 2004-118022 | 4/2004 |
| JP | 2005-284247 | 10/2005 |

OTHER PUBLICATIONS

U.S. Appl. No. 11/216,472, filed Sep. 1, 2005, Minoru Kato, Nikon Corporation.

European Patent Office Communication, mailed Jan. 2, 2008 and issued in corresponding European Patent Application No. 05 107 981.2-2217.

U.S. Office Action for parent U.S. Appl. No. 11/216,472; mailed Feb. 8, 2008.

* cited by examiner

Figure 1:
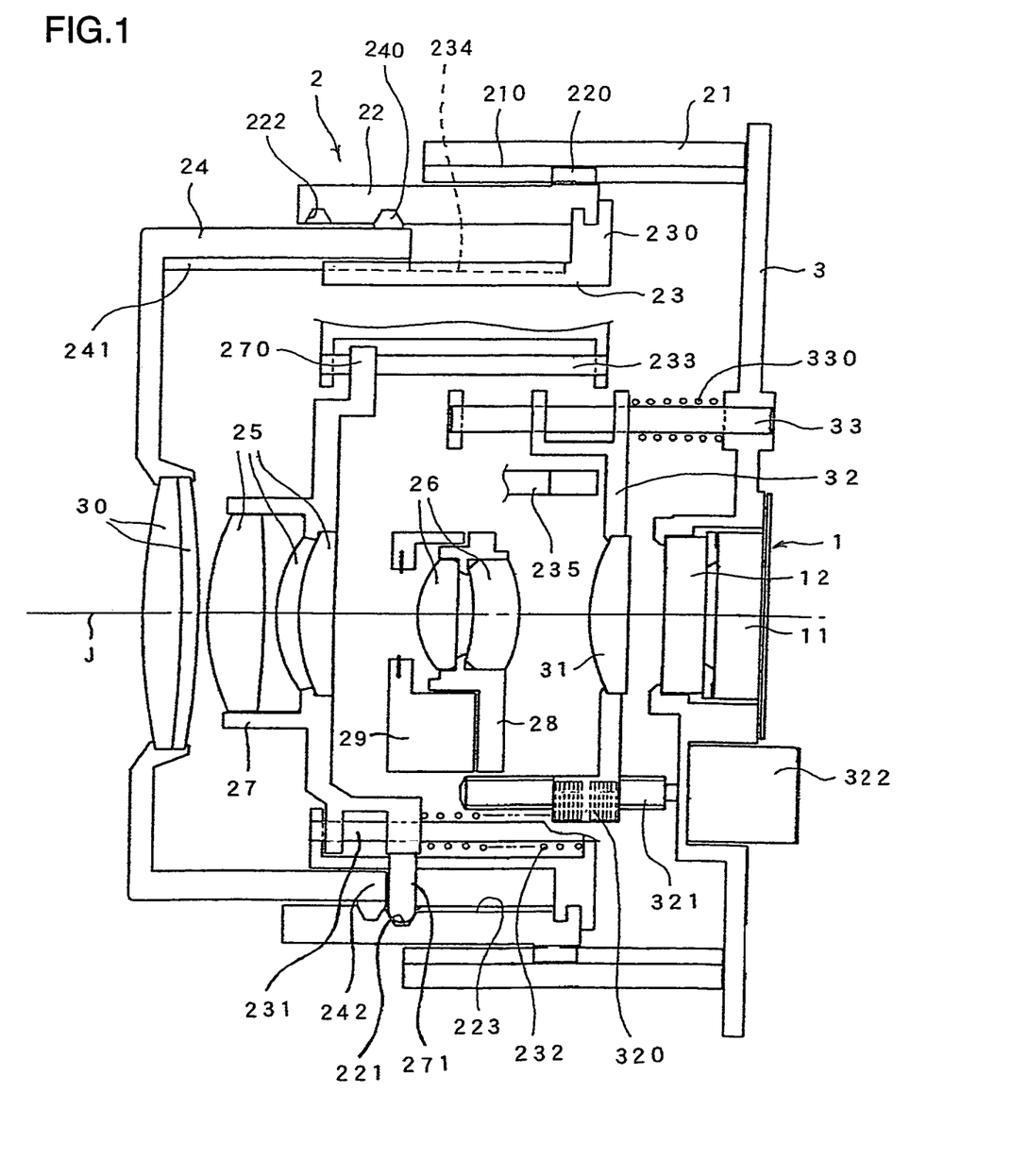
FIG. 1 is a cross-sectional diagram for describing a retractable lens camera in the wide-angle state according to the present invention.
Figure 2:
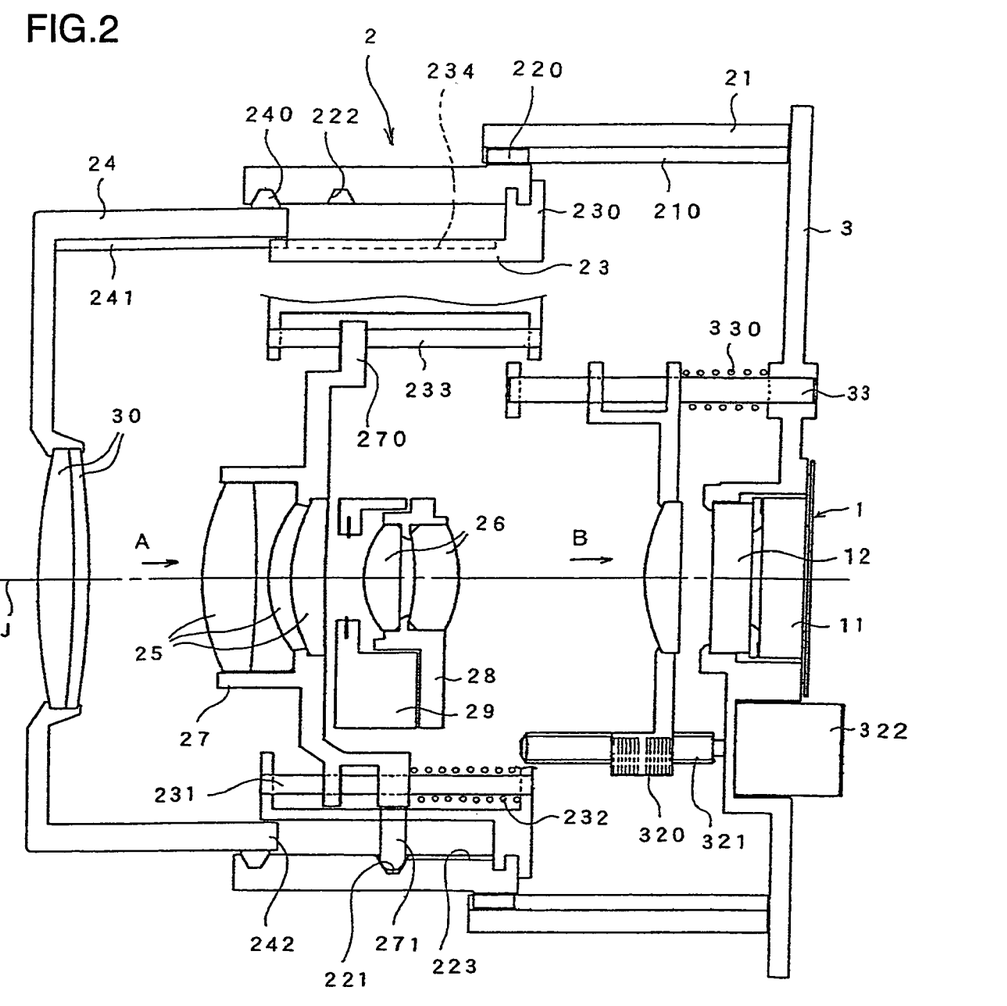
FIG. 2 is a cross-sectional diagram which shows the camera in the telephoto state.
Figure 3:
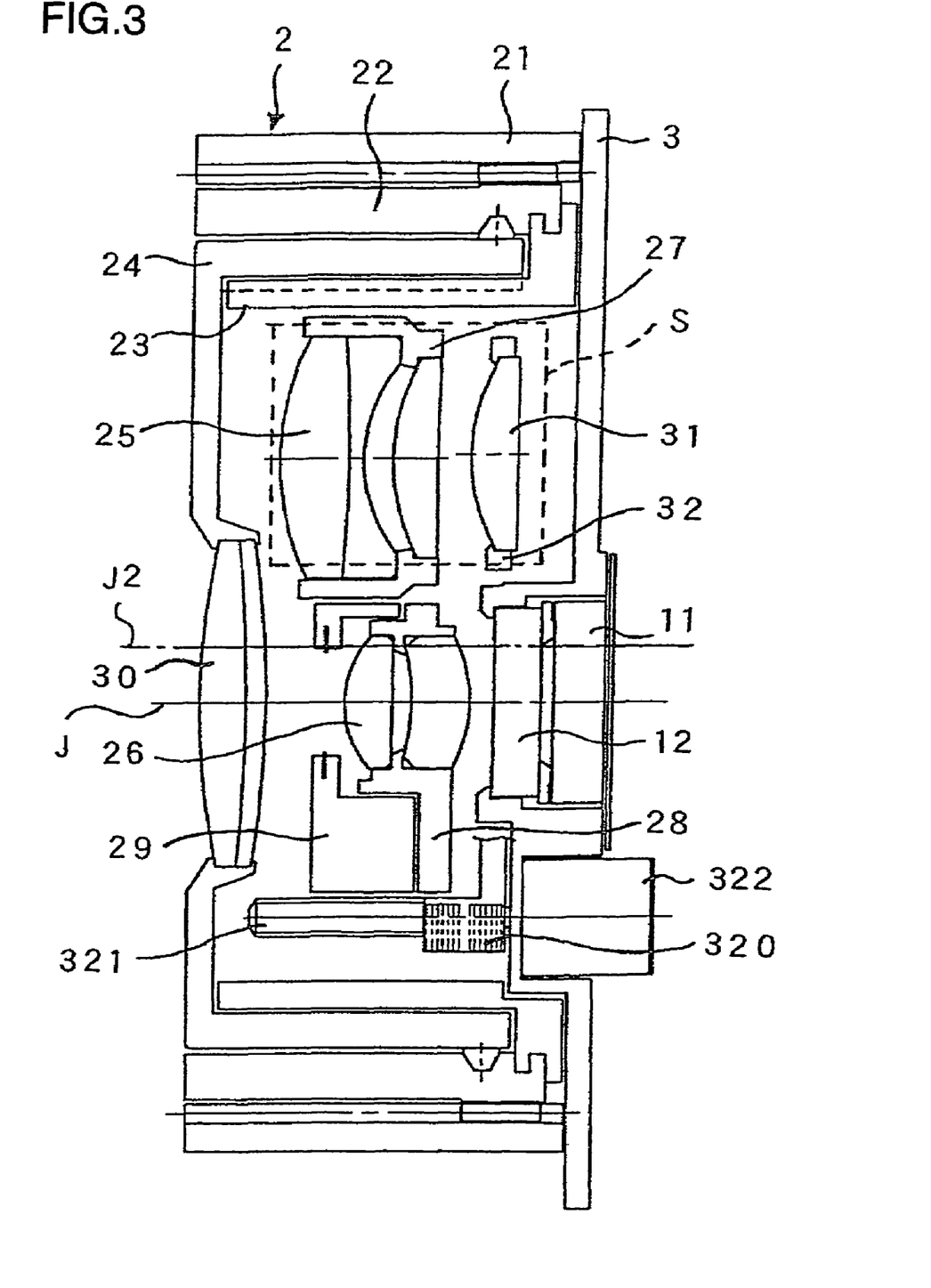
FIG. 3 is a cross-sectional diagram which shows the camera in the lens-barrel retracted state.
Figure 10:
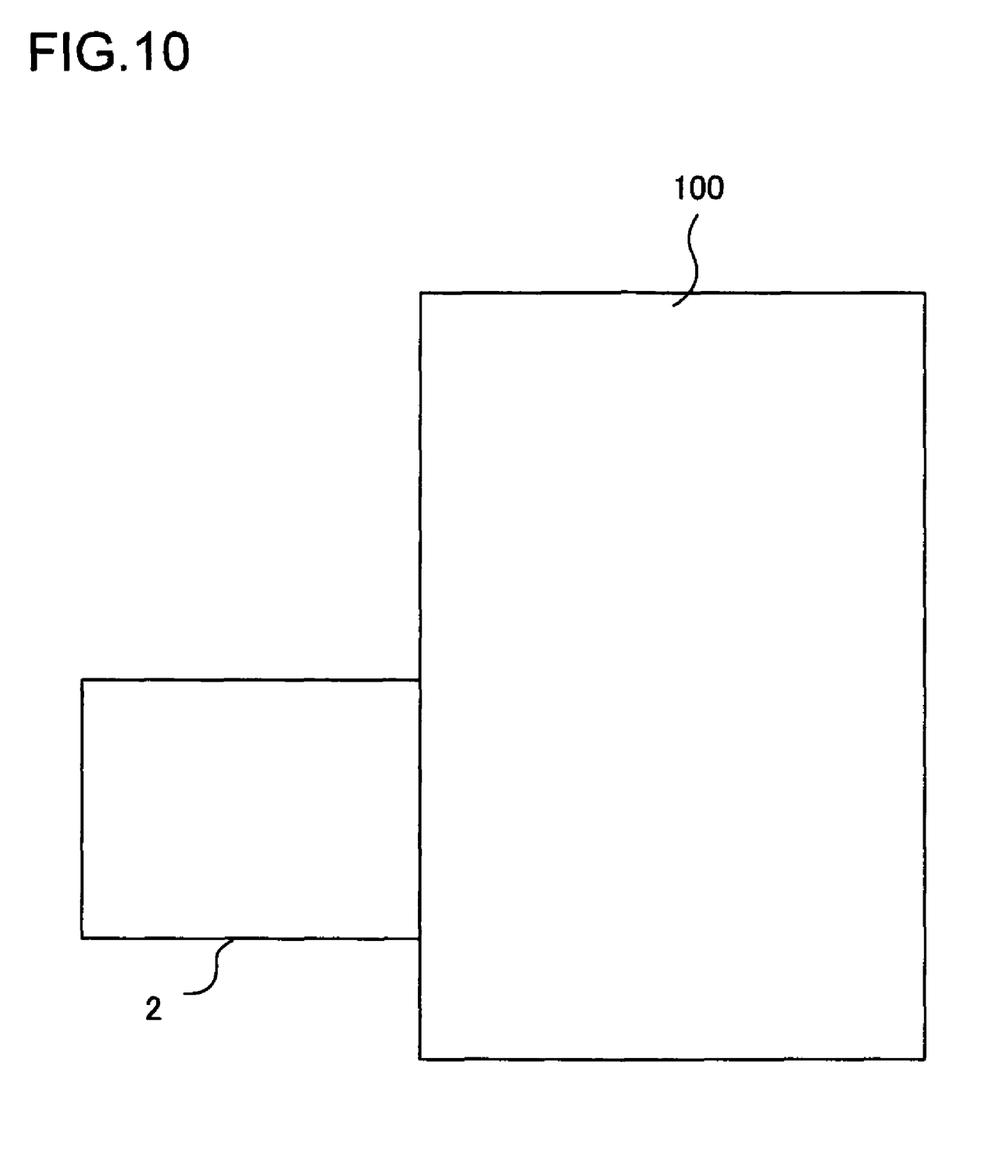
FIG. 10 is a diagram which shows the whole retractable lens camera including the lens barrel 2.

FIG.10 ically, are cross-sectional diagrams of an imaging system 1 and a lens barrel 2 of a digital still camera. Note that the lens barrel 2 mounted on the camera according to the present embodiment is a zoom lens barrel. FIG. 1 shows the camera in the wide-angle state, FIG. 2 shows the camera in the telephoto state, and FIG. 3 shows the camera in the lens-barrel retracted state. FIG. 10 is a diagram which shows the whole retractable
RETRACTABLE LENS CAMERA

CROSS-REFERENCE TO RELATED APPLICATIONS

This application is a continuation of U.S. application Ser. No. 11/216,472, filed Sep. 1, 2005, and now abandoned, which further claims the benefit of priority of Japanese Patent Application No. Japanese Patent Application No. 2004-255696 filed Sep. 2, 2004, the contents of which are incorporated herein by reference.

BACKGROUND OF THE INVENTION

1. Field of the Invention

The present invention relates to a retractable lens camera.

2. Description of the Related Art

With lens-non-detachable cameras, various types of retractable lens cameras are known which have a function of retracting a lens barrel within the camera body thereof, thereby reducing the size thereof in the non-photographing state (see Japanese Laid-open Patent Publication No. H9-203842).

SUMMARY OF THE INVENTION

The aforementioned cameras have a configuration which allows the lens groups to move within the lens barrel along the optical axis, thereby retracting the lens barrel within the camera body. Such a camera has a limitation in which the thickness thereof cannot be smaller than the sum of the total thickness of the lenses and the clearances in the lens-barrel retracted state.

According to the 1st aspect of the invention, a retractable lens camera comprises: a lens barrel; three or more lens groups provided in the lens barrel; a retracting unit that retracts the lens barrel and the lens groups into a camera body; and a displacing unit that displaces at least two lens groups to an escaping space out of an optical axis.

According to the 2nd aspect of the invention, in the retractable lens camera according to the 1st aspect, it is preferred that the displacing unit displaces the at least two lens groups to the escaping space in an identical direction.

According to the 3rd aspect of the invention, in the retractable lens camera according to the 1st or 2nd aspect, it is preferred that the retracting unit moves the at least two lens groups in the escaping space toward a rear of the camera.

According to the 4th aspect of the invention, in the retractable lens camera according to any one of the 1st through 3rd aspects, it is preferred that the escaping space is formed by disposing a photographing optical system, which includes the three or more lens groups, with an eccentric design in the lens barrel.

According to the 5th aspect of the invention, in the retractable lens camera according to any one of the 1st through 4th aspects, it is preferred that the at least two lens groups are disposed in a direction of an optical axis within the escaping space.

According to the 6th aspect of the invention, in the retractable lens camera according to any one of the 1st through 5th aspects, it is preferred that the lens barrel comprises a turn cylinder; and the retracting unit retracts the lens barrel and the lens groups into the camera body in association with turning of the turn cylinder.

According to the 7th aspect of the invention, in the retractable lens camera according to the 6th aspect, it is preferred that the retracting unit includes: a holding member provided to a shaft relatively stationary as to turning of the turn cylinder so as to be swung around the shaft, with an end thereof across the shaft holding a lens group of the at least two lens groups, and with the other end having a protrusion; and a guide groove which is formed on an inner face of the turn cylinder for engagement with the protrusion, and which allows the protrusion to move by turning of the turn cylinder, thereby displacing the lens group held by the holding member from the optical axis to the escaping space.

According to the 8th aspect of the invention, in the retractable lens camera according to any one of the 1st through 7th aspects, it is preferred that the at least two lens groups includes a zoom lens group and a focus lens group.

According to the 9th aspect of the invention, in the retractable lens camera according to the 8th aspect, it is preferred that: the focus lens group includes a rack which contacts and is engaged with a focus driving lead screw; and the displacing unit swings the focus lens group to release the rack from being engaged with the focus driving lead screw and displace the focus lens group to the escaping space.

The retracting unit and the displacing unit can replaced with retracting means and displacing means respectively.

BRIEF DESCRIPTION OF THE DRAWINGS

FIGS. 6A and 6B are diagrams showing the actions of a follower pin 271, where FIG. 6A is a cross-sectional diagram showing the follower pin 271 within the cam groove 221, and FIG. 6B is a cross-sectional diagram showing the follower pin 271 with the tip thereof moving into the cam groove 223.

FIGS. 9A through 9C are diagrams which show the relation between a cam 235 and a holding frame 32, where FIG. 9A shows the photographing state, FIG. 9B shows the state in which the holding frame 32 is swung, and FIG. 9C shows the state in which the holding frame 32 is moved toward the base.

DETAILED DESCRIPTION OF THE PREFERRED EMBODIMENTS

Description will be made below regarding the embodiment of the present invention with reference to the drawings. FIGS. 1 through 3 are diagrams for describing a retractable lens camera according to the present invention, and specifically, are cross-sectional diagrams of an imaging system 1 and a lens barrel 2 of a digital still camera. Note that the lens barrel 2 mounted on the camera according to the present embodiment is a zoom lens barrel. FIG. 1 shows the camera in the wide-angle state, FIG. 2 shows the camera in the telephoto state, and FIG. 3 shows the camera in the lens-barrel retracted state. FIG. 10 is a diagram which shows the whole retractable lens camera including the lens barrel 2. The lens barrel 2 is retracted into the camera body 100 and does not protrude from the camera body 100, at non-photographing state.

In FIG. 1, reference numeral 3 denotes a base included in the main body of the camera. The imaging system 1 and the lens barrel 2 are fixed on the base 3. An imaging device 11 of the imaging system 1 is fixed on the base 3. Furthermore, an optical low-pass filter 12 is disposed upstream of the imaging device 11 on the optical axis thereof at a predetermined interval therebetween. Note that employed as the imaging device 11 is a CCD imaging device or the like.

The lens barrel 2 includes a fixed cylinder 21 fixed to the base 3, a cam cylinder 22, a linear-action cylinder 23, and a first-group cylinder 24, each of which is mounted so as to allow movement thereof as to the fixed cylinder 21 along the optical axis. The fixed cylinder 21 is fixed on the base 3 with unshown screws. A helicoidal internal thread 210 is formed on the inner face of the fixed cylinder 21 for being screwed to a helicoidal external thread 220 formed on the outer face of the cam cylinder 22. Upon turning the cam cylinder 22 as to the fixed cylinder 21 by actions of an unshown motor, the cam cylinder 22 is moved along the optical axis within the fixed cylinder 21.

The linear-action cylinder 23 is mounted so as to be inserted into the cam cylinder 22, and is turnably connected to the cam cylinder 22 at the rear end 230 thereof. Note that an unshown protrusion is formed at the rear end 230 of the linear-action cylinder 23 to protrude along the diameter direction. The protrusion is engaged with a straight groove (not shown) formed on the inner face of the fixed cylinder 21. This engagement allows the action of the liner-action cylinder 23 as follows. That is to say, upon turning the cam cylinder 22, the linear-action cylinder 23 is moved straight along with the cam cylinder 22 integrally along the optical axis without rotation of the linear-action cylinder 23.

The linear-action cylinder 23 includes second-group lenses 25 and third-group lenses 26 therewithin. The third-group lenses 26 are held by a holding frame 28 fixed to the linear-action cylinder 23, which allows the third-group lenses to integrally move along with the linear-action cylinder 23 along the optical axis. Furthermore, a shutter unit 29 is fixed to the holding frame 28. A holding frame 27 for holding the second-group lenses 25 is mounted to a guide shaft 231 provided to the linear-action cylinder 23 so as to allow sliding thereof along the optical direction. Furthermore, the holding frame 27 is mounted so as to allow swinging motion thereof with the guide shaft 231 as an axis.

A torsion compression spring 232 provided to the guide shaft 231 presses the holding frame 27 in the forward direction of the camera (in the left direction in the drawing) by compression force. At the same time, the torsion force of the torsion compression spring 232 presses an engaging portion 270 formed on the holding frame 27 to contact with a guide shaft 233. Furthermore, a follower pin 271 is formed on the outer face of the holding frame 27. The tip of the follower pin 271 is engaged with a cam groove 221 formed on the inner face of the cam cylinder 22. With such a configuration, upon turning the cam cylinder 22, the holding frame 27 is moved along the optical axis within the cam cylinder 22.

The first-group cylinder 24 holding the first-group lenses 30 is mounted so as to be inserted into the cam cylinder 22. Furthermore, a follower pin 240 formed on the outer face of the first-group cylinder 24 is engaged with a cam groove 222 formed on the inner face of the cam cylinder 22. Furthermore, a protrusion 241 formed on the inner face of the first-group cylinder 24 is engaged with a guide groove 234 formed on the linear-action cylinder 23. With such a configuration, upon turning the cam cylinder 22, the first-group cylinder 24 is moved within the cam cylinder 22 along the optical axis. Reference numeral 31 denotes a fourth-group lens held by a holding frame 32. The holding frame 32 is slidably mounted to a guide shaft 33 provided on the base 3. Furthermore, the holding frame 32 is mounted so as to allow swinging motion thereof with the guide shaft 33 as an axis.

A torsion compression spring 330 provided to the guide shaft 33 presses the holding frame 32 in the forward direction of the camera (in the left direction in the drawing) by compression force. At the same time, the torsion force thereof presses a rack 320 formed on the holding frame 32 to contact with a lead screw 321. FIG. 1 shows the camera in the wide-angle state, and FIG. 2 shows the camera in the telephoto state. In either state, the lead screw 321 mounted to the rotation axis of a motor 322 is screwed to the rack 320 formed on the holding frame 32. With such a configuration, upon rotation of the motor 322, the holding frame 32 holding the fourth-group lens 31 is moved along the optical axis. The movement of the fourth-lens 31 allows focus adjustment.

At the time of switching from the wide-angle state shown in FIG. 1 to the telephoto state shown in FIG. 2, the cam cylinder 22 is turned so as to extend forward. In this case, the linear-action cylinder 23 and the cam cylinder 22 are moved forward integrally. Furthermore, the first-group cylinder 24 is moved along the optical axis following the guide of the cam groove 222. On the other hand, the holding frame 27 holding the second-group lenses 25 is moved along the optical axis following the guide of the cam groove 221. As a result, the camera enters the telephoto state as shown in FIG. 2.

In any photographing state between the wide-angle state shown in FIG. 1 and the telephoto state shown in FIG. 2, the first-group lenses 30, the second-group lenses 25, the third-group lenses 26, and the fourth-group lens 31, are disposed in a straight line on the optical axis J. Let us say that the camera enters the lens-barrel retracted state shown in FIG. 3 from the wide-angle state shown in FIG. 1. In this case, the second-group lenses 25 and the fourth-group lens 31 are displaced from the position on the optical axis J to an escaping space S within the linear-action cylinder 23, shown at the upper portion in the drawing. At the same time, the cam cylinder 22, the linear-action cylinder 23, and the first-group cylinder 24, are moved backward. Thus, the lens barrel formed of such cylinders is retracted within the fixed cylinder 21.

Next, description will be made regarding the configuration of the second-group lens system, the configuration of the fourth-group lens system, and the displacing action.

[Regarding the Actions of the Second-Group Lens System]

Figure 4:
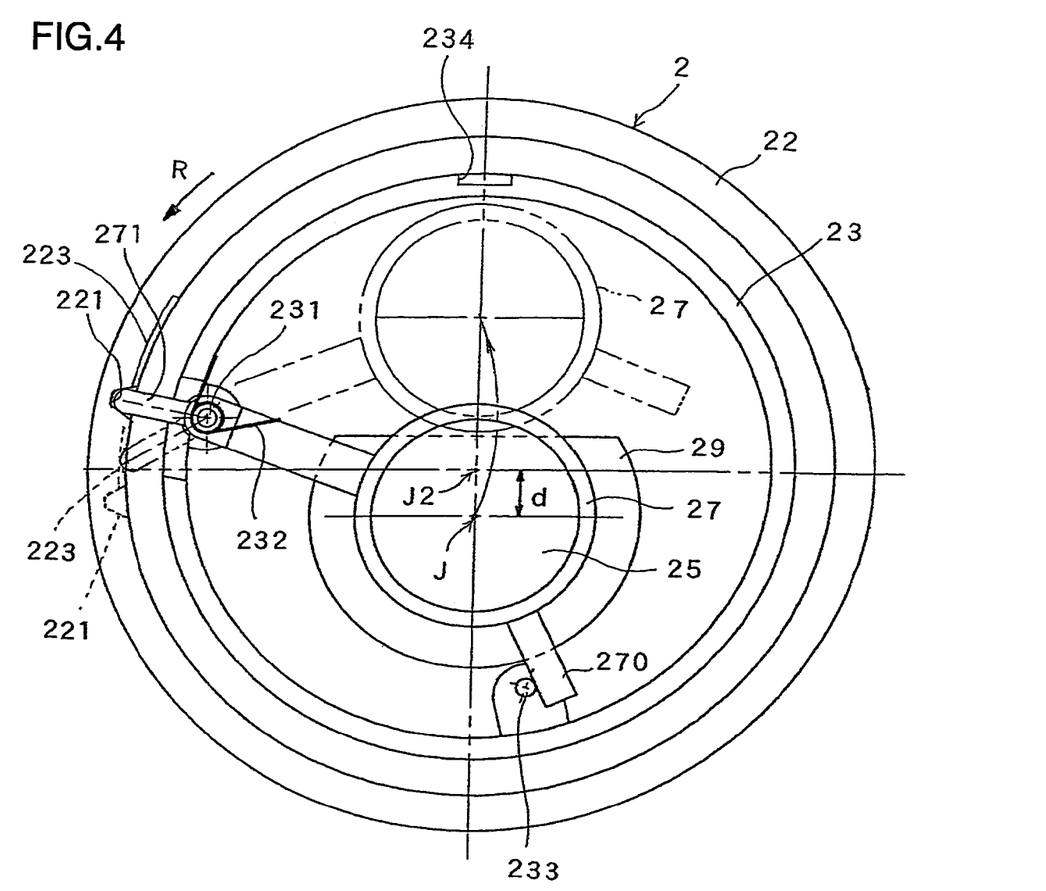
FIG. 4 is a diagram which shows a second-group lens system as viewed from the direction A shown in FIG. 2.

FIG. 4 is a diagram which shows the second-group lens system as viewed from the direction A shown in FIG. 2. The linear-action cylinder 23 is mounted so as to be inserted into the cam cylinder 22. As described above, the holding frame 27 holding the second-group lenses 25 is mounted so as to allow the swinging motion thereof with the guide shaft 231 as an axis. Note that the torsion compression spring 232 presses the engaging portion 270 to contact with the guide shaft 233.

In the drawing, represented by the solid line is the holding frame 27 positioned in the photographing state as shown in either FIG. 1 or FIG. 2. In this case, the second-group lenses 25 are disposed on the optical axis J. On the other hand, represented by the alternate long and two short dashes line is the holding frame 27 positioned in the lens-barrel retracted state shown in FIG. 3. As shown in FIG. 4, the optical axis J of the photographic optical system is shifted downward in the drawing by the distance d from the center axis J2 of the cam cylinder 22 and the linear-action cylinder 23. Accordingly, regarding the space in the linear-action cylinder 23, the space above the optical axis J is larger than the space below. Such an eccentric design of the optical axis J allows formation of the escaping space S above the shutter unit 29 as shown in FIG. 3.

In the wide-angle state shown in FIG. 4, the follower pin 271 provided to the holding frame 27 is engaged with the cam groove 221. Note that the cam groove 221 used for zoom actions in the photographing state communicates with a lens-barrel retracting groove 223. Upon turning the cam cylinder 22 in the direction of the arrow R in the wide-angle state shown in FIG. 4, the follower pin 271 is moved out from the cam groove 271 to the cam groove 223, thereby swinging the holding frame 27 holding the second-group lenses 25. Thus, the holding frame 27 is displaced upward from the optical axis J as represented by the alternate long and two short dashes line.

Figure 5:
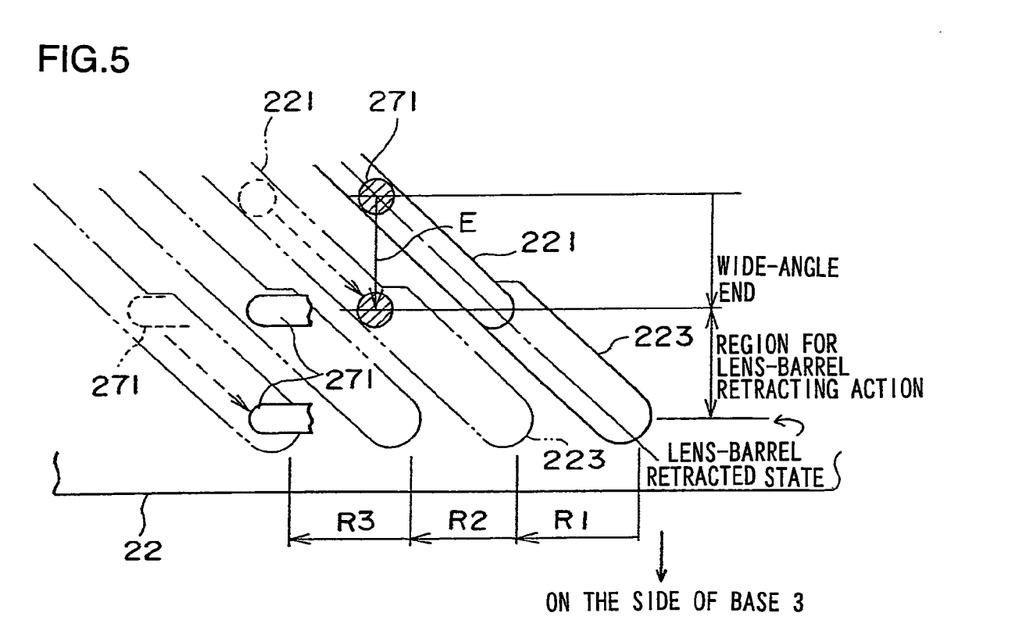
FIG. 5 is a development which shows cam grooves 221 and 223 formed on the inner face of a cam cylinder 22.
Figure 6:
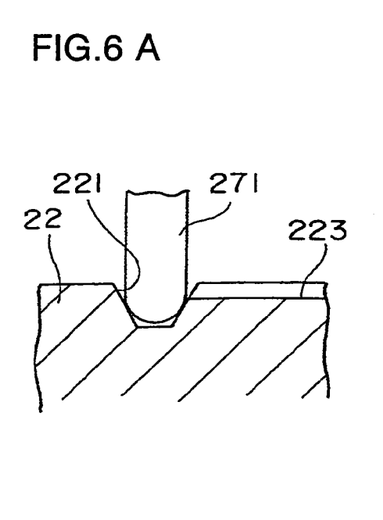

FIG. 5 is a diagram for describing the cam grooves formed on the inner face of the cam cylinder 22, and specifically, is a development which shows the cam groove 221 used for the wide-angle state around the end thereof, and the cam groove 223 used for the lens-barrel retracting actions. On the other hand, FIGS. 6A and 6B show the actions of the follower pin 271 following the guide of the cam grooves 221 and 223. With the present embodiment, the cam grooves 221 and 223 communicate with each other. Furthermore, the cam groove 223 is formed with a smaller depth than that of the cam groove 221 as shown in FIG. 6A.

Upon turning the cam cylinder 22 as represented by the arrows R1, R2, and R3, in that order, as shown in FIG. 5, the cam grooves 221 and 223 are moved in order, as to the follower pin 271 of the holding frame 27, as represented by the alternate long and two short dashes lines. First, upon application of the turn R1 to cam cylinder 22, the follower pin 271 is moved from a zoom position to a wide-angle end on the cam groove 221. At the same time, the holding frame 27 is moved toward the base by a predetermined distance denoted by the arrow E. Furthermore, the first-group cylinder 24 shown in FIG. 1 is moved toward the base 3 due to the turn of the cam cylinder 22. Upon the follower pin 271 reaching the wide-angle end of the cam groove 221, the end 242 of the first-group cylinder 24 comes in contact with the follower pin 271. In this state, the follower pin 271 positioned at the wide-angle end of the cam groove 221 is orthogonally engaged with the cam groove 221 as shown in FIG. 6A.

Upon further turning the cam cylinder 22 after the turn R1, the follower pin 271 tilts within the cam groove 221 as shown in FIG. 6B, thereby swinging the holding frame 27 with the guide shaft 231 as an axis. Then, upon turning the cam cylinder 22 by the turn R2, the follower pin 271 tilts so that the tip thereof is positioned at the same height as that of the bottom of the cam groove 223. Note that the swinging angle of the holding frame 27 is determined by the difference in the depth between the cam grooves 221 and 223. On the other hand, the first-group cylinder 24 is not moved along the optical axis during the turn R2 of the cam cylinder 22, thereby keeping the end 242 of the first-group cylinder 24 and the follower pin 271 in contact with each other.

Figure 7:
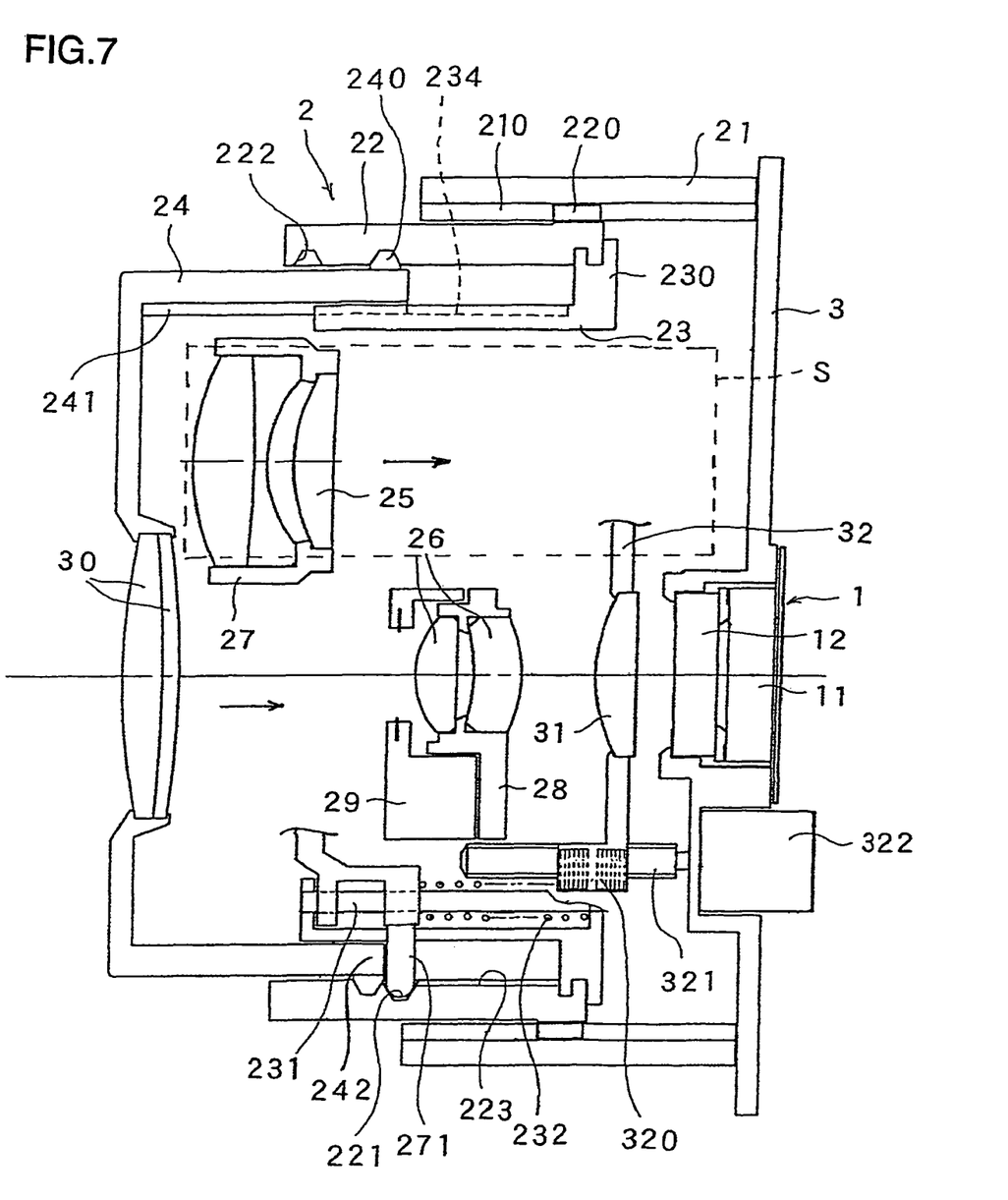
FIG. 7 is a cross-sectional diagram which shows the camera after the turn R2 of the cam cylinder 22.

FIG. 7 is a cross-sectional diagram which shows the camera after the turn R2. In this state, the second-group lenses 25 are displaced from the optical axis J to the escaping space S above the three-group lenses 26 due to the swinging of the holding frame 27. Then, upon further turning the cam cylinder 22 by the turn R3, the first-group cylinder 24 is moved toward the base 3, and the end 242 presses the follower pin 271 toward the base. As a result, as shown in FIG. 6B, the follower pin 271 slides out from the cam groove 221, and moves toward the base 3 following the guide of the cam groove 223 as shown in FIG. 5.

As a result, as shown in FIG. 7, the first-group cylinder 24 and the second-group lenses 25 move integrally toward the base 3. Furthermore, the second-lenses 25 are moved above the third-group lenses 26. With the present embodiment described above, following the follower pin 271 sliding out from the cam groove 221, the end 242 of the first-group cylinder 24 presses the follower pin 271 toward the base 3, thereby moving the holding frame 27 backward toward the base 3. With such a mechanism, the present invention is not restricted to a configuration including the cam groove 223, rather, an arrangement may be made which allows the follower pin 271 to slide out from the cam groove 221 to the inner face of the cam cylinder 22 having no cam groove 223.

With such a configuration as well, the follower pin 271 is pressed into contact with the inner face of the cam cylinder 22 by actions of the torsion compression spring 232, thereby preventing the holding frame 27 from turning as to the linear-action cylinder 23. Accordingly, such a configuration allows the same path of the follower pin 271 as that shown in FIG. 5.

[Regarding the Actions of the Fourth-Group Lens System]

Figure 8:
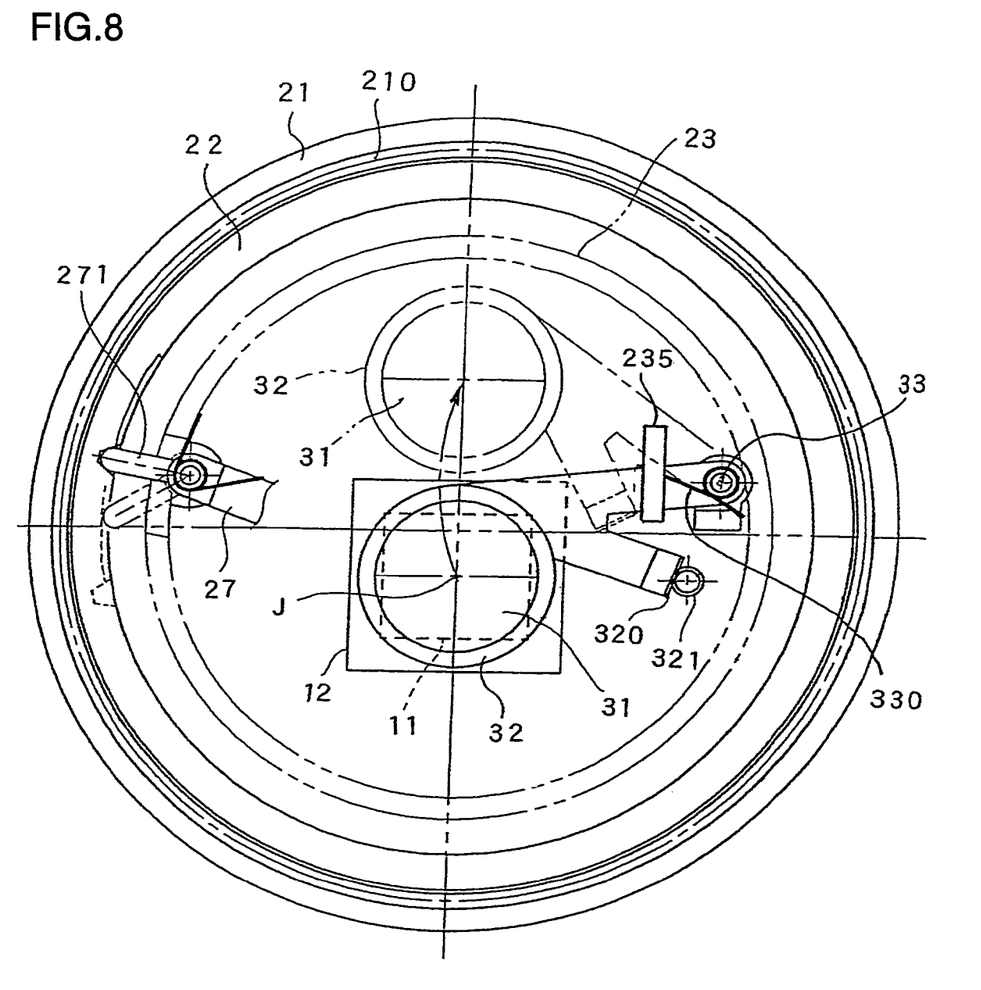
FIG. 8 is a diagram which shows a fourth-group lens system as viewed from the direction B shown in FIG. 2.

FIG. 8 is a diagram which shows the fourth-group lens system as viewed from the direction B shown in FIG. 2. As described above, the fixed cylinder 21, the cam cylinder 22, and the linear-action cylinder 23, are disposed in that order from the outside. The holding frame 32 holding the fourth-group lens 31 is slidably mounted to the guide shaft 33 fixed to the base 3 (see FIG. 1). Note that the linear-action cylinder 23 is represented by the alternate long and two short dashes line in the drawing. The torsion compression spring 330 applies torsion to the holding frame 32 such that the holding frame 32 is turned counterclockwise. The rack 320 of the holding frame 32 is pressed to contact with and be screwed to the lead screw 321.

FIG. 8 shows the camera in the telephoto state in which the fourth-group lens 31 is disposed on the optical axis J. Reference numeral 235 denotes a cam provided to the linear-action cylinder 23. Upon the cam 235 engaging with the holding frame 32 holding the fourth-group lens 31, the holding frame 32 is swung. In the drawing, represented by the alternate long and two short dashes line is the holding frame 32 turned clockwise and displaced from the optical axis J by actions of the cam 235.

Figure 9:
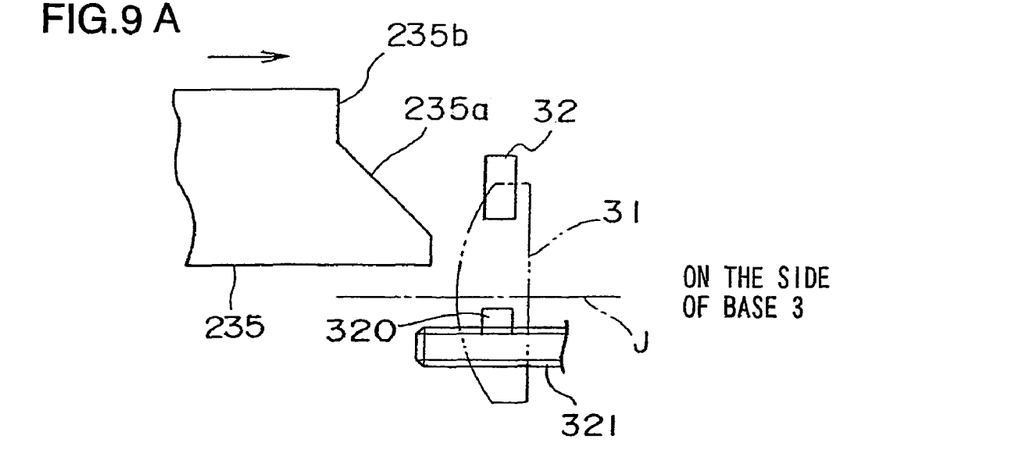

FIGS. 9A through 9C are diagrams which show the relation between the cam 235 and the holding frame 32, and is a diagram which shows a part of the cam 235 as viewed from the side of the guide shaft 33 shown in FIG. 8. FIG. 9A shows the state in which the cam 235 and the holding frame 32 are not engaged with each other. Note that the cam 235 and the holding frame 32 are disposed in the state as shown in FIG. 9A in any state between the telephoto state and the wide-angle state. On the other hand, FIGS. 9B and 9C show the state in which the cam 235 and the holding frame 32 are engaged with each other. In other words, FIGS. 9B and 9C show the cam 235 and the holding frame 32 in the lens-barrel retracted state.

With such a configuration, the cam 235 and the linear-action cylinder 23 are moved integrally. Note that a slope 235a and a pressing face 235b are formed at the tip of the cam 235. In the state shown in FIG. 9A, the rack 320 of the holding frame 32 is pressed to contact with and be screwed to the lead screw 321, and the fourth-group lens 31 is disposed on the optical axis J. Upon further turning the cam cylinder 22 in the wide-angle state shown in FIG. 1, the lens-barrel retracting action is executed. In the lens-barrel retracting action, the cam 235 is moved backward toward the base 3, and the slope 235a comes in contact with the holding frame 32.

Then, upon the cam 235 further moving backward as shown in FIG. 9B, the holding frame 32 is moved upward against the torsion force of the torsion compression spring 330. While the force applied to the holding frame 32 from the slope 235a has a backward component, the compression force of the torsion compression spring 330 is designed so as to be greater than the backward component. Accordingly, the holding frame 32 is turned without sliding backward. As a result, the rack 320 of the holding frame 32 disengages from the lead screw 321, and the fourth-group lens 31 starts to move away from the optical axis.

Upon cam 235 further moving backward, the holding frame 32 is moved upward to the position of the pressing face 235b. In this state, the camera completely enters the lens-barrel retracted state as shown in FIG. 8, in which the fourth-group lens 31 is swung from the optical axis J to the escaping space above the optical axis J. The fourth-group lens 31 is displaced to the space within the linear-action cylinder 24, formed above the optical axis J shifted from the center of the linear-action cylinder 24 in the same way as with the second-group lenses 25. With the present embodiment, the second-group lenses 25 and the fourth-group lens 31 thus displaced are disposed in a line in the thickness direction as shown in FIG. 3. Subsequently, the holding frame 32 is pushed toward the base 3 against the compression force of the torsion compression spring 330 while maintaining the state in which the holding frame 32 and the pressing face 235b are pressed to contact with each other. Thus, the camera enters the lens-barrel retracted state shown in FIG. 3.

In the embodiment, the second-group lenses 25 and the fourth-group lens 31 are displaced or moved out in the same direction perpendicular to the optical axis of the lens barrel 2, and displaced or moved out into the same escaping space. By this means, the size of the lens barrel and the size of the retractable lens camera in the diameter direction of lens are reduced.

With the present embodiment as described above, the optical axis J of the photographing optical system is designed to be positioned downward from the center axis J2 of the lens barrel 2 so as to form the escaping space S above the optical axis J as shown in FIG. 3. Such a configuration allows the second-group lenses 25 and the fourth-group lens 31 to be completely displaced to the escaping space. Note that in the retracted state, the second-group lenses 25 and the fourth-group lens 31 do not overlap with the first-group lenses 30 and the third-group lenses 26 in the thickness direction.

However, the present invention is not restricted to such an arrangement, rather, an arrangement may be made in which the second-group lenses 25 and the fourth-group lens 31 are swung somewhat less such that the second-group lenses 25 and the fourth-group lens 31, thus displaced, overlap with the first-group lenses 30 and the third-group lenses 26 in the lens-barrel retracted state. Even with such a configuration, the camera has the advantage of reducing the thickness thereof in the lens-barrel retracted state since the lens group is somewhat shifted from the optical axis. Furthermore, an arrangement may be made in which the lens-barrel center axis J2 matches the optical axis J, and the swinging of the second-group lenses 25 and the fourth-group lens 31 is designed according to such a layout.

With the present embodiment described above, the second-group lenses 25 and the fourth-group lens 31 are turned in the same direction so as to be disposed in a line in the thickness direction. Also, an arrangement may be made in which the second-group lenses 25 and the fourth-group lens 31 are turned in opposite directions with the optical axis J as the center. With such a configuration, the second-group lenses 25 and the fourth-group lens 31 are not disposed serially in the thickness direction, but can be disposed opposite one to another across the optical axis at generally the same position in the optical-axis direction, in the lens-barrel retracted state. Such a configuration allows more reduction of the overall thickness of the camera in the lens-barrel retracted state. While description has been made regarding an arrangement in which two of the four lens groups are displaced away from the optical axis, an arrangement may be made in which three of the four lens groups are displaced away. Furthermore, the present invention is not restricted to an arrangement including the four lens groups, rather, the present invention may be applied to an arrangement including three, five, or more lens groups.

The above described embodiments are examples, and various modifications can be made without departing from the spirit and scope of the invention.

What is claimed is:

1. A retractable lens camera, comprising:
   a lens barrel;
   three or more lens groups provided in the lens barrel;
   a retracting unit that retracts the lens barrel and the lens groups into a camera body; and
   a displacing unit that displaces at least two lens groups to an escaping space out of an optical axis, wherein
   the at least two lens groups includes a zoom lens group and a focus lens group,
   the focus lens group includes a rack which is engaged with and is disengaged from a focus driving lead screw, and
   the displacing unit swings the focus lens group to release the rack from being engaged with the focus driving lead screw and displaces the focus lens group to the escaping space.

2. A retractable lens camera according to claim 1, wherein the displacing unit displaces the at least two lens groups to the escaping space in an identical direction.

3. A retractable lens camera according to claim 1, wherein, the retracting unit moves the at least two lens groups in the escaping space toward a rear of the camera.

4. A retractable lens camera according to claim 1, wherein the escaping space is formed by disposing a photographing optical system, which includes the three or more lens groups, with an eccentric design in the lens barrel.

5. A retractable lens camera according to claim 1, wherein the at least two lens groups are disposed in a direction of an optical axis within the escaping space.

6. A retractable lens camera according to claim 1, wherein the lens barrel comprises a turn cylinder; and
   the retracting unit retracts the lens barrel and the lens groups into the camera body in association with turning of the turn cylinder.

7. A retractable lens camera according to claim 6, wherein the retracting unit includes:
   a holding member provided to a shaft relatively stationary as to turning of the turn cylinder so as to be swung around the shaft, with an end thereof across the shaft holding a lens group of the at least two lens groups, and with the other end having a protrusion; and
   a guide groove which is formed on an inner face of the turn cylinder for engagement with the protrusion, and which allows the protrusion to move by turning of the turn cylinder, thereby displacing the lens group held by the holding member from the optical axis to the escaping space.

8. A retractable lens camera according to claim 1, wherein the retracting unit includes a cam; and
   when the retracting unit retracts the lens barrel, the cam swings the focus lens group to release the rack from being engaged with the focus driving lead screw, and to displace the focus group to the escaping space, and moves the focus lens group toward a rear of the camera in the escaping space.

9. A retractable lens camera according to claim 8, wherein the cam includes a first face to swing the focus lens group, and a second face to move the focus lens group toward the rear of the camera, and the retracting unit further includes a pressing member to prevent the focus lens group from sliding toward the rear of the camera when the first face causes the focus lens to be swung.

* * * * *

UNITED STATES PATENT AND TRADEMARK OFFICE
CERTIFICATE OF CORRECTION

| | | |
|---|---|---|
| PATENT NO. | : 7,785,021 B2 | Page 1 of 1 |
| APPLICATION NO. | : 12/222450 | |
| DATED | : August 31, 2010 | |
| INVENTOR(S) | : Minoru Kato | |

It is certified that error appears in the above-identified patent and that said Letters Patent is hereby corrected as shown below:

Column 1, Lines 8-9 after "priority of" delete the first occurrence of "Japanese Patent Application No.".

Signed and Sealed this
Fifth Day of July, 2011

David J. Kappos
*Director of the United States Patent and Trademark Office*